J. F. METTEN.
STEAM PROPULSION APPARATUS.
APPLICATION FILED JUNE 18, 1912.
1,214,207.
Patented Jan. 30, 1917.
8 SHEETS—SHEET 7.
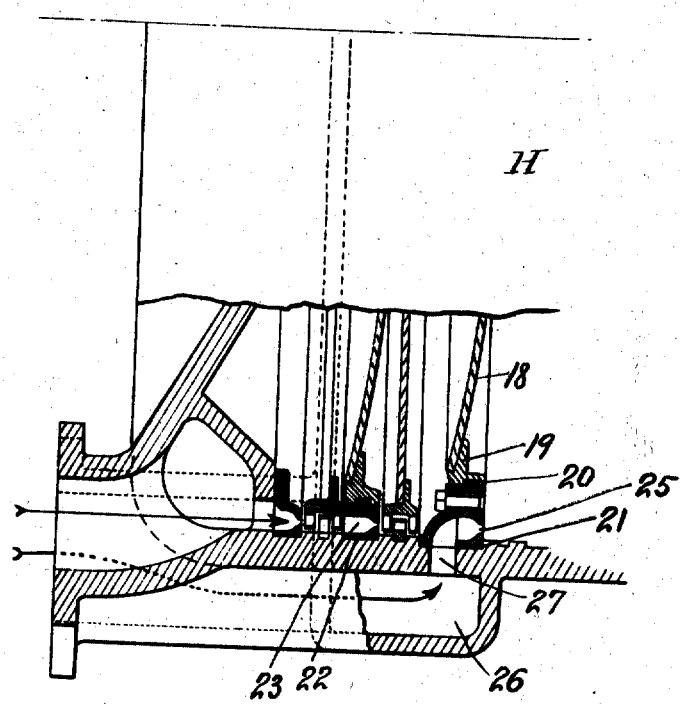
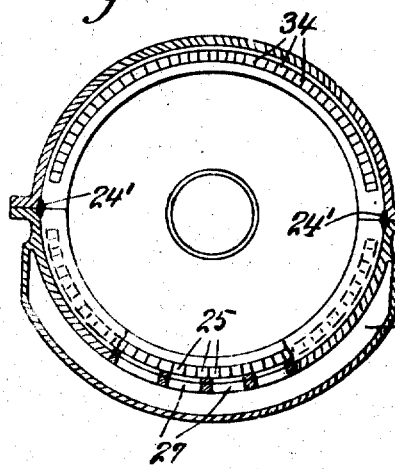
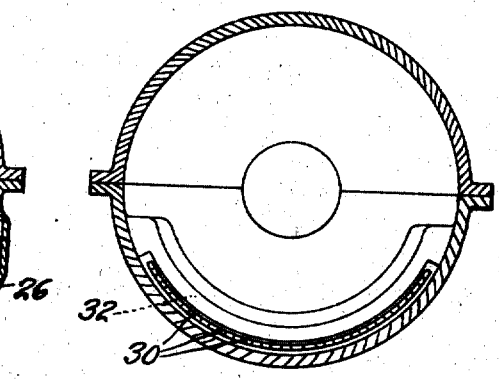

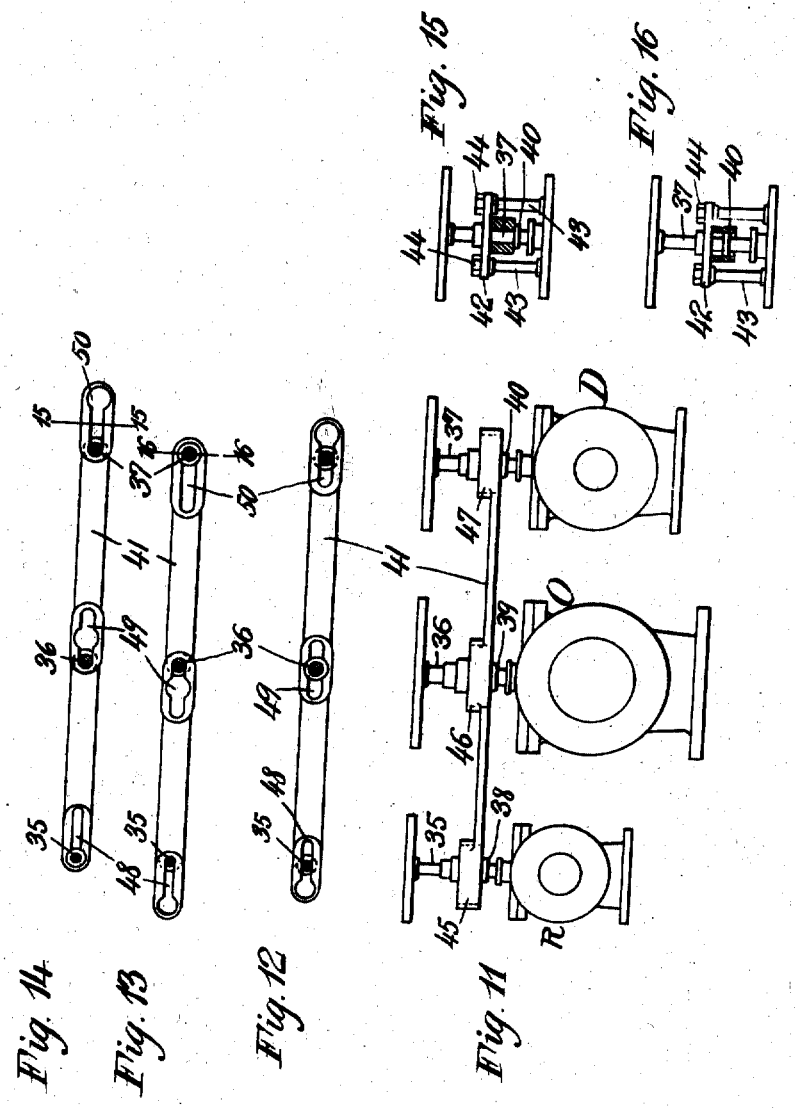

UNITED STATES PATENT OFFICE.

JOHN F. METTEN, OF PHILADELPHIA, PENNSYLVANIA, ASSIGNOR TO THE WILLIAM CRAMP & SONS SHIP & ENGINE BUILDING COMPANY, A CORPORATION OF PENNSYLVANIA.

STEAM PROPULSION APPARATUS.

1,214,207.

Specification of Letters Patent.   Patented Jan. 30, 1917.

Application filed June 18, 1912.   Serial No. 704,376.

*To all whom it may concern:*

Be it known that I, JOHN F. METTEN, a citizen of the United States, residing at Philadelphia, in the county of Philadelphia and State of Pennsylvania, have invented certain new and useful Improvements in Steam Propulsion Apparatus, of which the following is a full, clear, and exact specification.

This invention relates to prime movers for marine propulsion and its object is to provide a combination steam engine and turbine propelled vessel which shall operate at high efficiency at different rates of speed.

It has been heretofore proposed to utilize combinations of reciprocating engines and turbines for this purpose, but there have been certain difficulties in the way of attaining high efficiency under the conditions of marine practice. If for low speeds the engine utilizes part of the expansion, and the turbine utilizes the remainder of the expansion, then the last stages of the turbine rotate practically idly and cause friction and loss. If the turbine be provided with additional stages and the entire expansion utilized in the turbine at low speeds, the additional stages rotate idly at high speeds and the last stages are practically idle at low speeds.

In carrying out my invention, I propose to provide a small cruising engine arranged to utilize the upper ranges of the expansion and to exhaust into the first stage of the turbine, the expansion of the steam being carried out through the stages of the turbine to the final exhaust pressure. I further provide a system wherein the efficiency of the turbine is increased by insuring that the same shall at all times be operated by steam in the proper condition of dryness. For higher speeds one or more of the upper stages of the turbine may be shunted and finally the steam may be led directly from the boiler to the turbine and expanded through some or all of the stages thereof. In my arrangement, the number of idle stages at any time is reduced and moreover the few idle stages will only be idle during a time at which the loss occasioned thereby will be insignificant.

The invention will be described more in detail with reference to the accompanying drawings, in which—

Figure 1:
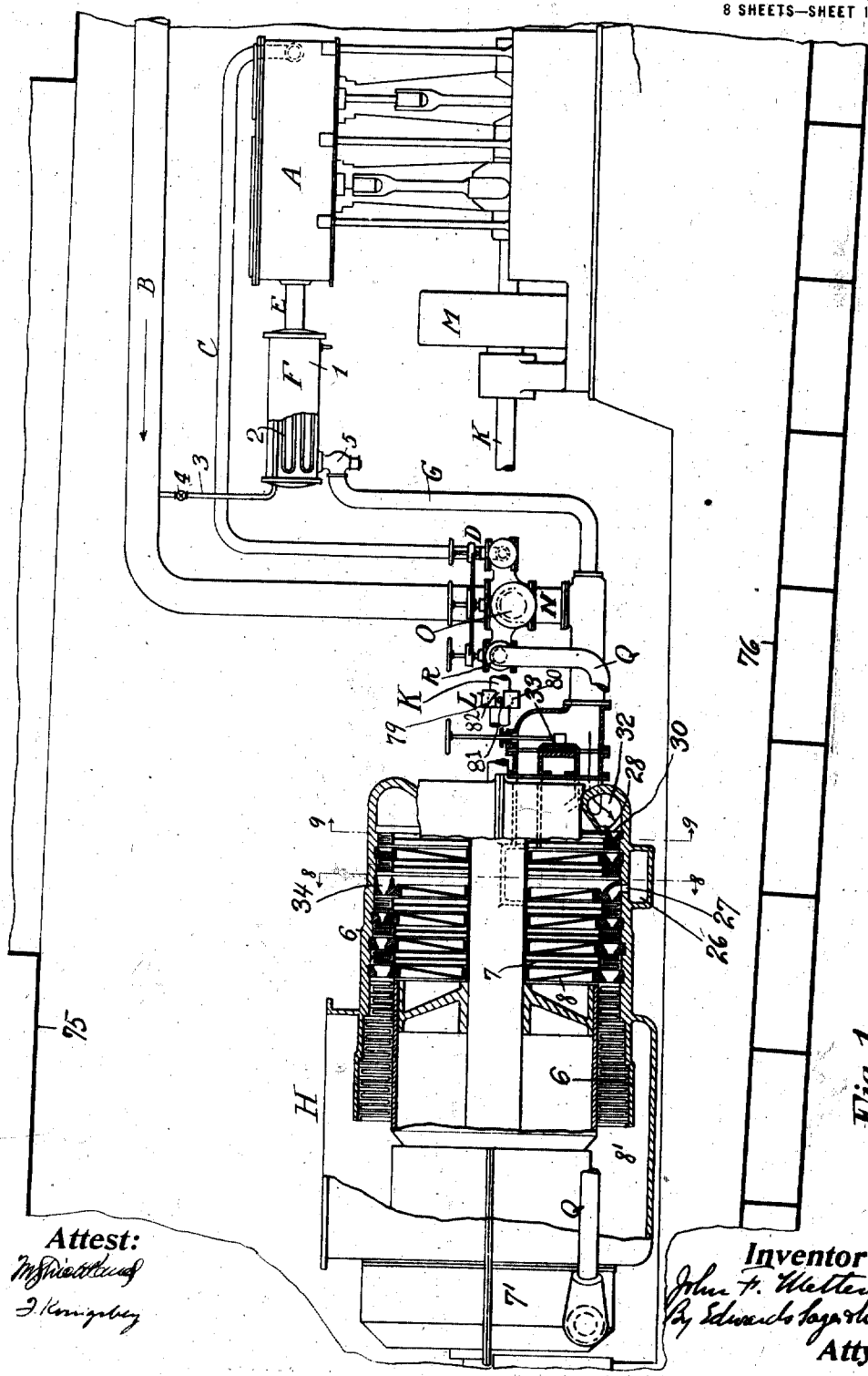
Figure 2:
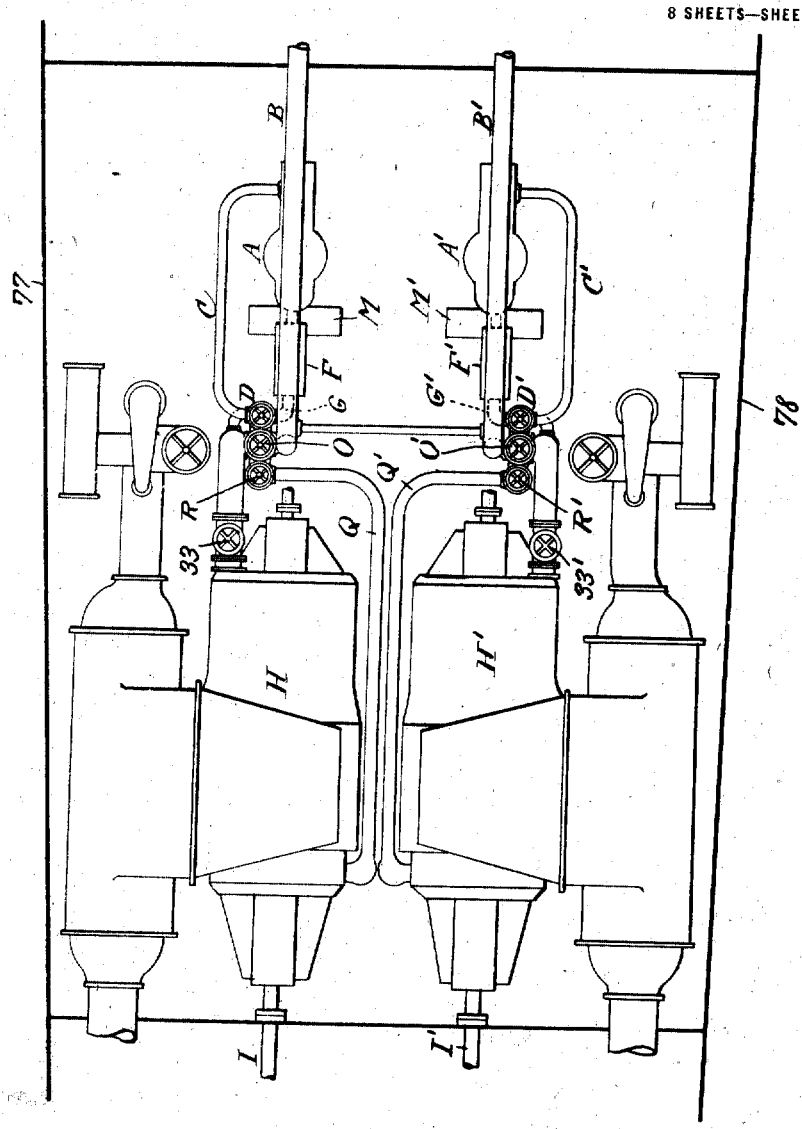
Figure 3:
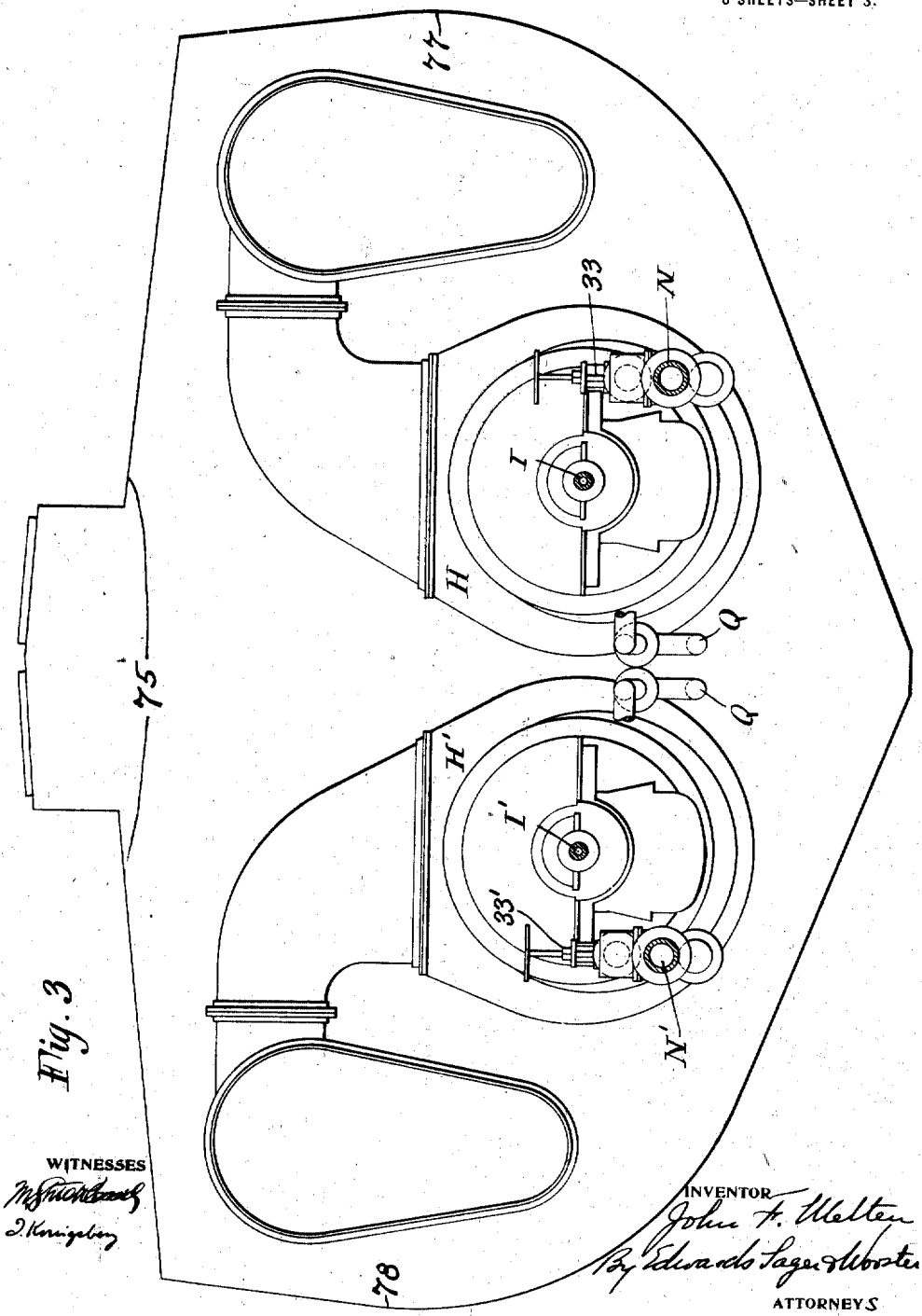
Figure 4:
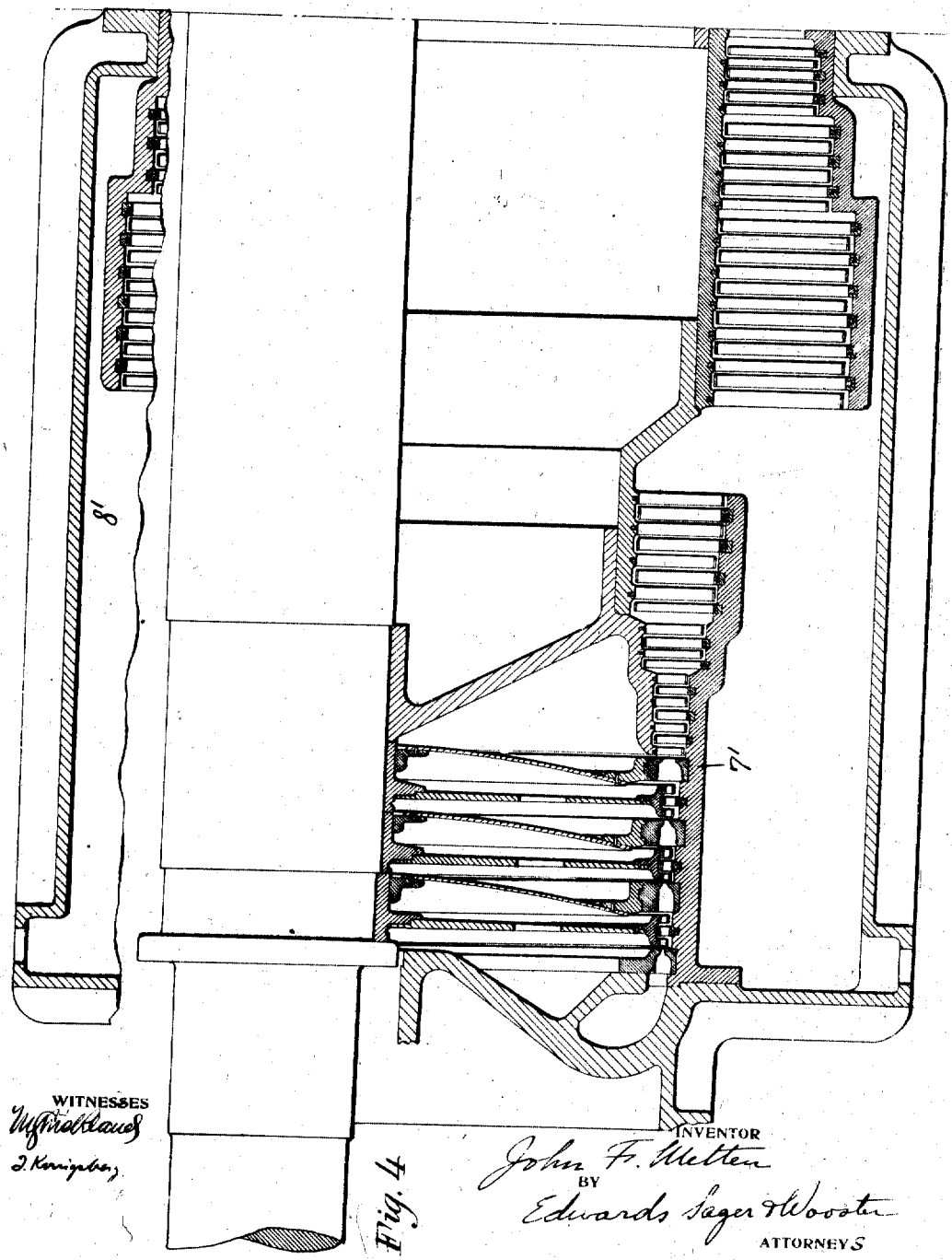
Figure 5:
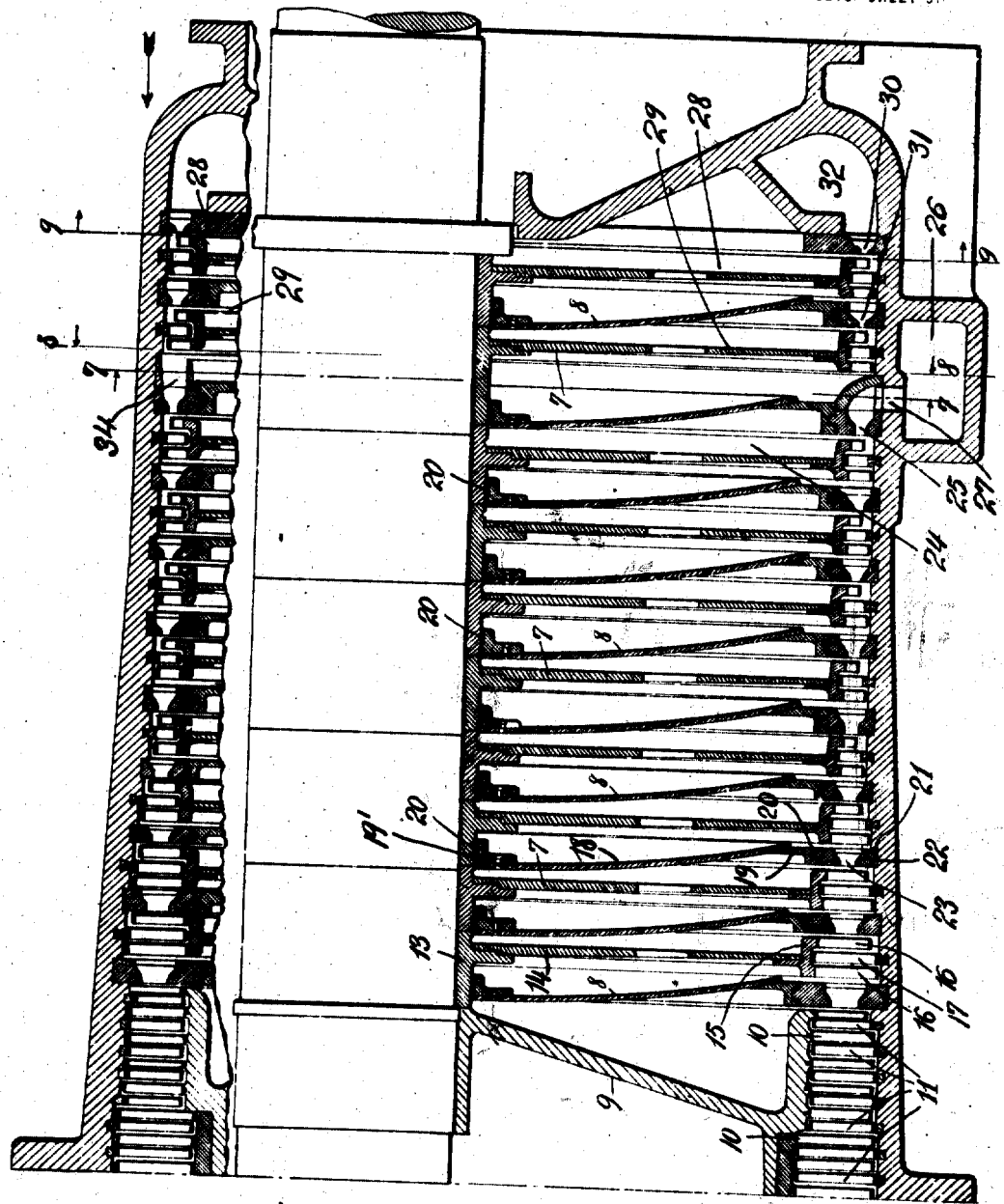
Figure 6:
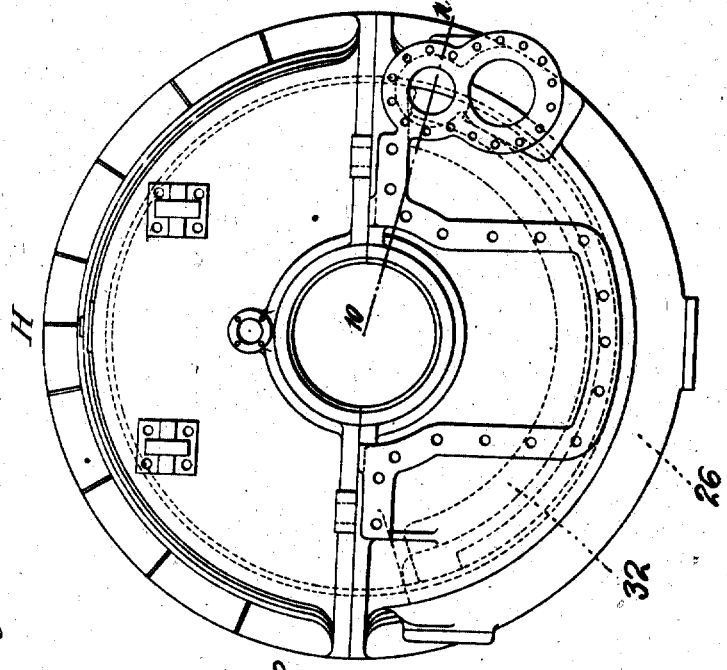
Figure 7:
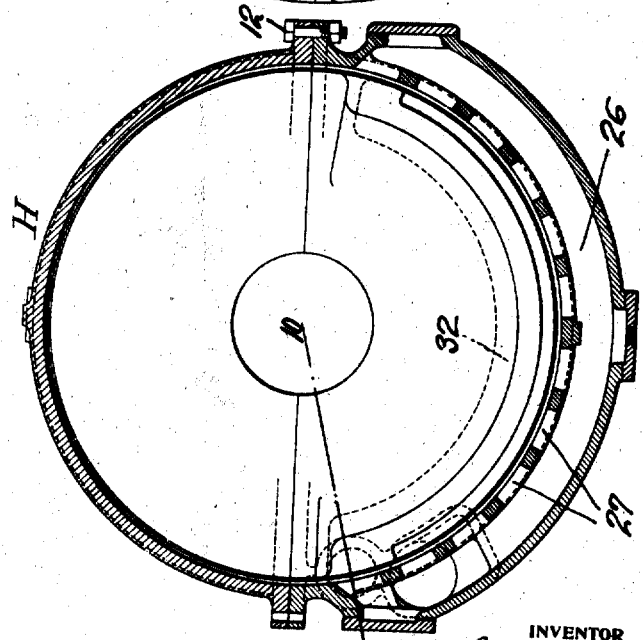

Figure 1 is an elevation, showing its arrangement in the hull of a vessel, of a driving unit for one propeller shaft. A general sectional view of the ahead turbine is shown in this figure, the turbine details being more particularly shown in other figures hereinafter referred to; Fig. 2 is a plan view of the arrangement of apparatus in the hull of a vessel for driving twin propellers; Fig. 3 is a vertical section through the hull of a vessel showing the arrangement therein of the units for driving the twin screw, the section through the hull being taken just forward of the turbines and looking aft; Figs. 4 and 5 placed end to end with Fig. 5 at the right of Fig. 4 constitute a vertical central section of the steam turbine, the upper half being partially broken away; Fig. 6 is an exterior end elevation of the turbine looking in the direction indicated by the arrow in Fig. 5, the scale of this drawing being reduced from that of Figs. 4 and 5; Fig. 7 is a vertical transverse section, on the same scale as Fig. 6, of the turbine casing upon the line 7—7 of Fig. 5 looking in the direction of the adjacent arrows; Fig. 8 is a vertical transverse section, the turbine wheels being omitted on the line 8—8 of Figs. 1 and 5, looking in the direction of the adjacent arrows, this figure being drawn to a different scale from either Fig. 1 or 5 and has the casing partly broken away to show the ports in the casing for the full power steam admission and also the initial full power nozzles; Fig. 9 is a transverse section, the blade wheels being omitted, upon the lines 9—9 of Figs. 1 and 5 looking in the direction of the adjacent arrows. This figure is drawn for the same scale as Fig. 8; Fig. 10 is an enlarged partial section on the line 10—10 of Figs. 6 and 7 looking in the direction of the adjacent arrows and shows the manner of admitting steam to the auxiliary and full power initial stages of the turbine; Fig. 11 is an elevation of valve structures with an interlocking device applied thereto; Fig. 12 is a top plan view of the interlocking bar showing the middle valve operative and the other two locked; Fig. 13 is a similar view, but shows the locking bar slid to the left so that the right-hand valve is operative and the other two lock; Fig. 14 is a similar view, but with the locking bar slid to the right so that the left-hand valve is operative and the other two lock; Fig. 15 is a section through the locking bar on the line 15—15 of Fig. 14, looking in the direction of the adjacent arrow, showing the valve shut and locked by the bar against opening; and Fig. 16 is a section through the locking bar on the line 16—16 of Fig. 13 showing the locking bar in position to permit opening of the valve and the entering of the valve stem collar into the bar in the act of opening the valve.

Referring to the drawings, A represents a reciprocating engine which may be of any suitable type preferably adapted to utilize high pressures of steam and to expand the same from boiler pressure to a determined lower pressure. This engine is supplied with steam by means of the pipe B which comes from the boilers and the pipe C which is controlled by a valve D. From the exhaust of the engine A a pipe E leads the exhaust steam which, particularly at low powers, contains considerable moisture to a re-heater F where the steam is brought to a suitable degree of dryness or is slightly superheated and is then transmitted through a pipe G to the turbine H, which it traverses to the turbine exhaust. From the turbine H extends the propeller shaft I.

The engine crank shaft may be coupled in driving relation to the turbine shaft by means of a shaft section K which, at one end, is coupled by means of a universal and expansion coupling L with the turbine shaft and, at the other end, is releasably secured to the crank shaft of the engine by means of a clutch M.

Live steam may be supplied from the boilers to the ahead end of the turbine by means of a pipe N controlled by a valve O. And live steam from the boilers can be supplied to the astern end of the turbine by means of a pipe Q controlled by a valve R.

The re-heater comprises a casing 1 to which the exhaust steam is fed and within which is located a coil of pipe 2 which may be fed with live steam through a pipe 3 controlled by a valve 4. The other end of the pipe coil is connected with a drain through a trap. Located in the pipe G between the turbine and the re-heater is a check valve 5 of suitable construction to permit the steam to pass from the re-heater to the turbine but not in the opposite direction.

The turbine H may be of any suitable type, either all reaction or all impulse stages, or some of the stages may be impulse and some reaction. In the particular form shown in the drawing, the higher stages are wheel stages of the impulse type, which may be either single or velocity compounded, and the lower stages are impulse drum stages. The ahead end of the turbine comprises a cylindrical casing 6 within which the wheels 7 and diaphragms 8 of the wheel stages and also the drum 9 with its moving vanes 10 and intermediate blading 11 are mounted. Similarly, the astern turbine has an external cylindrical casing 7' and both casings open into the exhaust belt 8'. The turbine casing is divided in a horizontal longitudinal plane, the upper and lower halves being secured together by bolts 12.

Each of the wheels 7 is built up of a hub 13, an intermediate plate 14 and a blade ring 15 having two rows of blades 16 secured to its periphery and in between these rows of blades project the stationary guide blades 17 secured to the casing. As shown, the intermediate plate 14 has one of its faces in a plane radial to the axis of the shaft of the turbine, while the other face is at an angle thereto, so that the plate tapers in thickness from the inside to the outside. Also this intermediate plate is provided with a groove at its inner edge which receives a shoulder on the hub and when the inner edge of the plate is riveted to the hub, as shown, a secure joint is formed. At its outer edge the plate is riveted to a flange upon the blade ring.

Each of the diaphragms 8 comprises a preferably dished or concave steel plate 18, at the outer edge of which is secured a grooved steel ring 19, while at the opposite side on the inner edge of the plate 18 a steel gland ring 19' is secured thereto and carries packing 20 just clearing the hubs of the wheels. As shown, the plate is secured to the gland ring and the steel ring 19 by riveting. The rings 19 and 19' stiffen the disk or plate 18, whereby it may be made considerably lighter without rendering it liable to distortion when subjected to pressure and also by dishing the plate and fastening the rings on opposite sides they overlie one another and save space. The diaphragm or the ring 19 secured thereto is provided with a peripheral groove 20 and also the casing has a groove 21. Mounted to slide between these grooves, and at the same time lock the diaphragm against longitudinal movement, is a nozzle ring 22 preferably of cast iron and containing nozzles 23 of suitable design. The nozzle ring sections may be secured to the casing by bolts or screws 24', in order to resist the reaction of the flow through the nozzles. These bolts are exposed when the casing is lifted, the upper nozzle section coming off with the casing and the lower one being removable by sliding in the groove when the bolts are removed. The nozzle ring 22 is divided into halves which, when one-half of the casing is removed, can be separated from between the casing and the diaphragm independently of the wheel, one-half by simply being lifted and the other half by being slid around the groove until it can be likewise lifted. The removing of the top section of the casing releases or unlocks one section of the nozzle ring permitting its removal and the other section can then be removed by pushing it circumferentially. It will be understood that the nozzle ring might be divided into any number of segments desired larger than two.

Referring to the ahead end of the turbine, steam is admitted to the first stage 24 for full power by means of the nozzle 25. This initial nozzle provides for partial admission, the passage from the inlet belt 26 to the nozzles being provided by ports 27 cut in the casing. The later stages preferably have full peripheral admission. In order that reduced powers may be employed, two auxiliary wheels or stages 28 and 29 are fitted forward of the full power turbine. These auxiliary stages are supplied with nozzles 30 and 31 of reduced length suitable for passing the volume of steam required under the reduced power conditions, the steam passing through these auxiliary stages coming from a steam chamber 32. The flow of steam to the inlet belt 26 and that to the steam chamber 32 is controlled by means of a valve 33. When the valve is positioned to shut off steam from the steam chamber 32, steam will be admitted through the inlet belt and the full power turbine while it will be cut off from the auxiliary reduced power stages. When the valve is moved to close the passage to the inlet belt 26 steam will be cut off from the full power inlet of the turbine, but will be admitted to the steam chamber 32 and the auxiliary stages. With an intermediate position of the valve, steam will be admitted to both the inlet belt 26 and the steam chamber 32. It will be observed that in the diaphragm preceding the first full speed stage there is not only provided the full power initial nozzles 25 but on the opposite side of this diaphragm from the nozzles just referred to there is provided a separate nozzle 34 leading from the last auxiliary stage 29 into the first full speed stage and proportioned to carry the volume which passes from the last auxiliary stage to the first full speed stage at low powers. This low power nozzle 34, it will be observed, although it is separate from and opposite to the initial full power nozzle 25, operates upon the same wheel. This arrangement allows in a given total number of stages one more stage being proportioned for the reduced speed condition than would be possible in the ordinary arrangement of continuous nozzles and results in increased efficiency of the turbine.

Preferably, the nozzles and blades of the turbine from the full power inlet to the exhaust, are calculated for maximum efficiency with an expansion from the pressure of steam direct from the boiler to the pressure of exhaust, while the nozzles and blades of the auxiliary low speed stages and the nozzles 34 are calculated to most economically utilize the pressure drop, which will occur therein when steam is supplied directly from the boiler to the steam chamber 32, and expanded thence through the auxiliary and full power stages of the turbine down to the exhaust pressure. It will now be understood that steam admitted to the steam chamber 32 will pass through the auxiliary nozzles 30 and 31 and then crossing over in the stage 29 passes through the nozzle 34 into the first full speed stage whence the full power stages are traversed to the exhaust.

For full speed, steam is admitted directly from the boiler to the full power initial nozzles 25, the valve 33 being positioned to close the admission to the chamber 32 and opening admission to the ports 27. Also the valves D and R are closed, the valve O being open. The steam direct from the boiler then passes from the inlet ports 27 through all of the full power stages of the turbine to the exhaust. At this time the wheels in the auxiliary stages of the turbine are idle, but this occurs at a time when the loss from the idle stages will be unimportant. For lower power conditions the change valve 33 is positioned to shut off the steam from the inlet ports 27 and open communication for the steam from the boiler to the steam chamber 32, the valves R and D being closed. The expansion of the steam direct from the boiler then takes place through the auxiliary stages and full power stages down to the exhaust pressure. With the valve 33 in an intermediate position so that steam is admitted to both the full power inlet and the steam chamber 32, a condition exists which provides for the carrying of overloads above that capable of being driven by steam flowing through the full power inlet alone.

At the maximum power under which the reciprocating engine will be available, the valves O and R are closed and the valve D is open. Also the valve 33 is in an intermediate position. Live steam from the boiler is thus shut off from the turbine while such steam is supplied to the reciprocating engine from which the steam expands to a determined lower pressure, the exhaust passing into the reheater F where the exhaust steam is re-heated to the required degree of dryness or superheat and from thence the steam passes into the full power initial inlet and also into the auxiliary inlet whence it expands through the turbine stages down to the turbine exhaust pressure. At further reduced speeds, the valve 33 is set to close the admission to the auxiliary inlet and open the admission to the full power inlet of the turbine, the valves D, O and R remaining as before. The steam direct from the boiler is then passed through the reciprocating engine where it is expanded through the higher ranges to a determined lower pressure at which it exhausts into the re-heater whence the steam, after being dried or superheated, passes into the full power inlet through the ports 27 and full power stages of the turbine to the exhaust. At still further reduced speeds, the valves, except valve 33, may remain as before and valve 33 may be set to close the admission to the full power inlet and open admission to the steam chamber 32 feeding the auxiliary stages. The steam then coming from the re-heater will traverse the auxiliary and full power stages of the turbine to the exhaust. To drive the ship astern, the valves D and O are closed and the valve R opened, when steam will be admitted direct from the boiler and expanded through the stages of the astern turbine to the pressure of the exhaust. In driving astern the reciprocating engine will be cut out by releasing the clutch M.

It will be observed that but one of the valves D, O and R, controlling the admission to the reciprocating engine, admission of steam direct from the boiler to the ahead turbine and admission of steam to the astern turbine, respectively, should be opened at a time, and to insure proper operation of these valves, interlocking means should be provided. This interlocking means may be of the form as shown more particularly in Figs. 11 to 16. Referring to Figs. 11 to 16 the valve stems 35, 36 and 37, are provided with collars or shoulders 38, 39 and 40. Embracing the valve stems above the collars is a bar 41 which may be slid endwise beneath bars 42 supported and secured to the valve bodies by rods 43 and nuts 44. At the points, 45, 46 and 47, where the bar 41 embraces the valve stems, it is thickened as shown and also formed with slots 48, 49 and 50 of sufficient size to receive the valve stems but not the collars 38, 39 or 40. At the left-hand end of the slot 48, the middle of the slot 49 and the right-hand end of the slot 50, is formed an enlarged circular part into which the respective collars 38, 39 and 40 may move with easy clearance. If the bar 41 is moved to such a position that the collar on one of the valve stems is directly beneath an enlarged portion of a slot, that valve stem may be turned and when the same rises in the opening of the valve its collar will enter within the enlarged portion of the slot above it and the valve will open. None of the other valves can be opened, however, for the reason that none of the other collars are in alinement with the enlarged slot portions and they cannot pass through the narrow portions of the slots. Under these conditions, if an attempt is made to open the valve, the collar will come against the bar at the sides of the slots and upward movement will be prevented. In the position of the bar as shown in the drawings, the central valve can be opened because the collar upon its stem is in line with the enlarged circular portion of its slot. Neither one of the other two collars are so in line and their valves cannot be opened. If, however, the valves are all closed, the bar could be pushed to the right until the enlarged portion of slot 48 was in alinement with the collar 38, when the left-hand valve could be opened and the other two would be locked closed. Similarly, when all the valves are closed, the locking bar might be slid to the left and the enlargement of the slot 50, brought into alinement with the collar on the stem 37, when the right-hand valve could be opened, the other two being locked closed. Furthermore, it will be observed that when any valve has been opened and its collar has entered within the corresponding slot enlargement, it will be impossible to slide the bar so as to permit any other of the valves to be opened.

It will be observed that all of the steam pipes supplying steam to the turbine are connected to the lower half. This is of advantage because the upper half of the turbine may be lifted off and the wheels and interior of the turbine exposed to view without disconnecting any of the steam supply pipes. This greatly facilitates access to the turbine in the event of accident or any cause requiring inspection or repair of the interior of the turbine and is of especial importance on shipboard in view of the limited engine room space. It will also be observed that there can be no pocketing of water or moisture in any of the steam connections between the reciprocating engine and the turbine as every change of level passing from the engine to the turbine is downward (and never upward) so that any water in the connections drains into the turbine whence the moisture will pass off.

The variable power propulsion system herein described has especial advantages for torpedo boat destroyers, or similar types of vessels, which ordinarily operate at less than their maximum speed, but must be able to develop much higher speed when required. Also, these vessels must have a large steaming radius at lower speed. In order to satisfy these and other requirements, guarantees are exacted as to maximum weights of propelling machinery, as well as of both fuel and water consumption at least two speeds for a specified hour's run. The present invention is of much value in enabling the guarantees to be fulfilled, and also in that space economized, and such fuel and water economy obtained as to very materially increase the steaming radius. It is to be remembered that such vessels are rarely run for very long at full speed, but must at all times economize water and fuel, and for most of the time run at cruising or intermediate speed. Consequently, economy at these speeds is of greater relative importance than economy at maximum or emergency speed. By the provision of the reheating means between the reciprocating engine and the turbine on the same shaft, the well-known advantages of the former are retained, while enabling reheated steam to be admitted to the turbine at the proper stages to secure the best economy, from the remaining expansion of the steam. In effect therefore, this invention involves a coördination between the steam engine, the reheater, and the turbine, such that the energy of the steam (water) output of the engine can be fully utilized in the turbine, with a minimum of idle stages at various speeds, and without either requiring the engine to drive the turbine, or vice versa. The reheater, combined as specified herein, enables this result to be accomplished, and vastly improves the propulsion system for the special purposes and conditions to be met.

In the drawings the deck of the ship is indicated by 75, the sides of the hull by 77 and 78, and 76 represents a support built between the sides of the hull.

The universal and expansion coupling L' which connects the shaft section K with the turbine shaft comprises a socket 79 within which fits a rounded head 80. From the rounded head 80 project pins 81 which take into the slots 82 in the sides of the socket. This permits the connected shafts to set themselves at angles with each other and also any difference in longitudinal relation of the connected shafts caused by expansion by heat or otherwise will be permitted by the pins 81 moving longitudinally in the slots of the socket. By the provision of such a universal and expansion joint, expansion of the shafts is permitted and also bad effects from inaccuracy in alinement of the shafts caused by errors or wear of the bearings are avoided.

While my invention is illustrated in the structure shown in the drawings, it is not limited thereto as it may be embodied in other structures.

What I claim is:

1. The combination with a reciprocating engine, of a turbine, said turbine and engine being connected in driving relation to the same shaft, said turbine having full power stages and auxiliary stages, means for supplying steam to said engine, and means for passing steam from the exhaust of said engine to the turbine and admitting it to either the full power or auxiliary stages.

2. The combination with a reciprocating engine, of a turbine, said turbine and engine being connected in driving relation to the same shaft, said turbine having full power stages and auxiliary stages, means for supplying steam to said engine, and means, comprising a reheater, for passing steam from the exhaust of said engine to the turbine and admitting it to either the full power or auxiliary stages.

3. The combination with a reciprocating engine, of a turbine, said engine and turbine being connected in driving relation to the same shaft, said turbine having full power stages and auxiliary stages, means for supplying steam to said engine, and means for passing steam from the exhaust of said engine to the turbine and admitting it simultaneously to both the full power and auxiliary stages.

4. The combination with a reciprocating engine, of a turbine, said turbine and engine being connected in driving relation to the same shaft, said turbine having full power stages and auxiliary stages, means for supplying steam to said engine, and means, comprising a reheater, for passing steam from the exhaust of said engine to the turbine and admitting it simultaneously to both the full power and auxiliary stages.

5. The combination with a reciprocating engine, of a turbine, said engine and turbine being connected in driving relation to the same shaft, said turbine having full power stages and auxiliary stages, means for supplying steam to said engine, and means for passing steam from the exhaust of said engine to the turbine and admitting it to either or simultaneously to both the full power and auxiliary stages.

6. The combination with a reciprocating engine, of a turbine, said engine and turbine being connected in driving relation to the same shaft, said turbine having full power stages and auxiliary stages, means for supplying steam to said engine, and means, comprising a reheater, for passing steam from the exhaust of said engine to the turbine and admitting it to either or simultaneously to both the full power and auxiliary stages.

7. The combination with a reciprocating engine, of a turbine, said turbine and engine being connected in driving relation to the same shaft, said turbine having full power stages and auxiliary stages, means for supplying steam to said engine, means for passing steam from the exhaust of the engine to the turbine, means for supplying steam to the turbine direct from the boiler, and means for admitting the steam supplied to the turbine from either source to either the full power or auxiliary stages.

8. The combination with a reciprocating engine, of a turbine, said turbine and engine being connected in driving relation to the same shaft, said turbine having full power stages and auxiliary stages, means for supplying steam to said engine, means, comprising a reheater, for passing steam from the exhaust of the engine to the turbine, means for supplying steam direct from the boiler to the turbine and means for admitting the steam supplied from either source to the turbine to either the full power or auxiliary stages.

9. The combination with a reciprocating engine, of a turbine, said turbine and engine being connected in driving relation to the same shaft, said turbine having full power stages and auxiliary stages, means for supplying steam to said engine, means, comprising a reheater, for passing steam from the exhaust of the engine to the turbine, means for supplying steam direct from the boiler to the turbine and means for admitting the steam supplied from either source to the turbine to either or both the full power and auxiliary stages.

10. The combination with a reciprocating engine, of a turbine, said turbine and engine being adapted to be connected in driving relation to the same shaft, a universal and expansion coupling for connecting said engine with said shaft, and means for passing steam from the exhaust of said engine to the initial full power stage of the turbine.

11. The combination with a reciprocating engine, of a turbine, said turbine and engine being adapted to be connected in driving relation to the same shaft, a universal and expansion coupling for connecting said engine to said shaft, and means for passing steam successively through said engine and turbine, said means comprising a reheater between said engine and said turbine.

12. A marine propulsion system comprising in combination with a propeller shaft, a reciprocating engine and a multi-stage turbine independently connected thereto, a reheater connected to the exhaust of the engine, and a steam connection between said reheater and the inlets to a plurality of stages of said turbine, said inlets being positioned to permit the steam from said reheater to drive the movable turbine element during further drop from the engine exhaust pressure, and means for controlling said inlets according to the speed to maintain a predetermined efficiency through the remaining stages.

13. A marine propulsion system comprising in combination with a propeller shaft, a reciprocating engine, and a multi-stage turbine independently connected thereto, said turbine having in addition to a full power inlet an auxiliary power inlet and auxiliary stages, a reheater connected to the exhaust of the engine, and connections from said reheater to said full power and auxiliary stage inlets adapted to be controlled to permit further expansion of the steam through the turbine stages within predetermined efficiency at various powers.

In testimony whereof I affix my signature, in presence of two witnesses.

JOHN F. METTEN.

Witnesses:
ISAAC ARROTT,
THOMAS HOWE.